(12) United States Patent  (10) Patent No.: US 9,423,277 B2
Anthony et al.  (45) Date of Patent: Aug. 23, 2016

(54) REMOTE OPTICAL POSITION SENSING DEVICE AND METHODS

(71) Applicant: RAYTHEON COMPANY, Waltham, MA (US)

(72) Inventors: David G. Anthony, Marana, AZ (US); Elka E. Koehler, Tucson, AZ (US); Byron B. Taylor, Tucson, AZ (US); Robert Rinker, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 101 days.

(21) Appl. No.: 14/564,833

(22) Filed: Dec. 9, 2014

(65) Prior Publication Data

US 2016/0161293 A1   Jun. 9, 2016

(51) Int. Cl.
*G02B 27/64* (2006.01)
*G01D 5/30* (2006.01)

(52) U.S. Cl.
CPC ........................... *G01D 5/30* (2013.01)

(58) Field of Classification Search
CPC ....... G02B 27/64; G02B 27/644; G02B 26/10
USPC .......... 250/216, 221, 234, 236; 244/3.16, 164
See application file for complete search history.

(56) References Cited

U.S. PATENT DOCUMENTS

| | | | |
|---|---|---|---|
| 2002/0145102 A1* | 10/2002 | Eckelkamp-Baker | G02B 27/646 250/203.1 |
| 2010/0220390 A1 | 9/2010 | Wein et al. | |
| 2013/0193315 A1 | 8/2013 | Shemesh | |
| 2015/0022874 A1* | 1/2015 | Martin | G02B 26/101 359/226.2 |

FOREIGN PATENT DOCUMENTS

WO   2008122814 A2   10/2008

OTHER PUBLICATIONS

International Search Report & Written Opinion mailed Dec. 11, 2015 in PCT Application No. PCT/US2015/053121, 9 pages.

* cited by examiner

*Primary Examiner* — Kevin Pyo
(74) *Attorney, Agent, or Firm* — Lando & Anastasi, LLP

(57) ABSTRACT

An optical position sensing system and method for sensing a gimbal position in a gimbal-based optical system. One example of an optical position sensing system includes an off-gimbal light source that generates a position sensing light beam and transmits the position sensing light beam along an optical coude path of the optical system, and an on-gimbal optical element that causes a change in an intensity of the position sensing light beam based on rotation of the gimbal about the axis. The system further includes an off-gimbal detector configured to receive the position sensing light beam returned from the optical element and to detect the change in the intensity of the position sensing light beam, and a controller coupled to the detector and configured to determine the gimbal position based on a correlation between the change in the intensity of the position sensing light beam and the gimbal position.

15 Claims, 2 Drawing Sheets

REMOTE OPTICAL POSITION SENSING DEVICE AND METHODS

BACKGROUND

Many optical systems include components mounted on board a gimbal, such as a roll/nod gimbal, that is used to point or steer the field of regard of the optical system. Measuring the gimbal position and angle using traditional on-gimbal position encoders and/or angle resolvers has several drawbacks. For example, optical on-axis position encoders are bulky and expensive, and angle resolvers tend to impart non-linearity errors into the control systems using the resolver data. Additionally, these components take up much-needed space on the gimbal platform. Furthermore, since a roll/nod gimbal spins freely in the roll axis, an expensive data slip ring is typically required to transfer the data signals from on-gimbal position encoders or angle resolvers to other off-gimbal (non-rotating) components, such as line-of-sight or beam steering devices, or other control devices, for example. Slip rings are electromechanical structures that are commonly used for passing electrical signals, such as power and/or data, between a rotating component and a stationary component. Data slip rings tend to be more expensive and noisy than power-only slip rings due to requirements to support the relatively high data rates necessary for effective transfer of data signals.

SUMMARY OF INVENTION

Aspects and embodiments are directed to devices and methods for measuring gimbal position off-gimbal, thereby addressing several of the disadvantages of conventional systems. By keeping the data signals associated with position sensing off-gimbal, the need for data signals to cross the gimbal axis may be eliminated, which may reduce the cost of the slip ring, as discussed further below. Additionally, the on-gimbal volume conventionally consumed by on-axis position encoders or angle resolvers may instead be used for larger collecting optics and/or other devices (such as additional sensors, for example) that may enhance the performance of the optical system and/or provide additional functionality for the system application(s).

According to one embodiment, an optical position sensing system for sensing a gimbal position in a gimbal-based optical system comprises a light source configured to generate a position sensing light beam, the light source being mounted off-gimbal in the optical system and further configured to transmit the position sensing light beam along an optical coude path of the optical system, an optical element mounted on an axis of the gimbal and configured to cause a change in an intensity of the position sensing light beam based on rotation of the gimbal about the axis, a detector mounted off-gimbal in the optical system and configured to receive the position sensing light beam returned from the optical element and to detect the change in the intensity of the position sensing light beam, and a controller coupled to the detector and configured to determine the gimbal position based on a correlation between the change in the intensity of the position sensing light beam and the gimbal position.

In one example, the optical element is a continuously varying neutral density filter. The optical position sensing system may further comprise a first polarizer positioned off-gimbal in an optical path of the position sensing light beam, wherein the optical element is a second polarizer. In one example, the first polarizer is positioned in front of the detector.

The optical position sensing system may further comprise a mirror disposed behind the optical element and configured to reflect the position sensing light beam back along the coude path.

In one example, the optical position sensing further comprises a first beam-splitter configured to couple the position sensing light beam from the light source into the coude path, and to direct the position sensing light beam returned from the coude path toward the detector. In another example, optical position sensing system further comprises a second beam-splitter disposed between the light source and the first beamsplitter, the second beam-splitter being configured to transmit the position sensing light beam from the light source to the first beam-splitter, and to reflect the position sensing light beam returned from the coude path via the first beam-splitter toward the detector.

In one example, the detector is a silicon intensity detector.

In another example, the light source is a laser light source.

The optical position sensing system may further comprise a local oscillator located off-gimbal and configured to produce a modulation signal, a laser driver coupled to the local oscillator and to the laser light source, and configured to drive the laser light source to produce a modulated position sensing light beam, a demodulator coupled to the local oscillator and to the detector, and configured to demodulate an output signal from the detector using the modulation signal to produce a demodulated signal, the demodulated signal including information corresponding to the change in the intensity of the position sensing light beam, and an analog to digital converted configured to receive the demodulated signal and to produce a digital version of the demodulated signal, wherein the controller is configured to receive and process the digital version of the demodulated signal to determine the gimbal position. In one example, the optical position sensing system further comprises an amplifier positioned between the detector and the demodulator and configured to amplify the output signal from the detector to produce an amplified output signal, and wherein the demodulator is configured to demodulate the amplified output signal.

Another embodiment is directed to a method of sensing a gimbal position in a gimbal-based optical system. In one example, the method comprises directing a position sensing light beam along an optical coude path of the optical system to an optical element mounted to a gimbal axis, altering an intensity of the position sensing light beam with the optical element, receiving the position sensing light beam returned from the optical element via the coude path at a detector located off-gimbal, detecting, with the detector, the intensity of the position sensing light beam, and determining the gimbal position based on a known correlation between the intensity of the position sensing light beam and an angular position of the gimbal.

The method may further comprise generating the position sensing light beam using a laser light source. In one example, generating the position sensing light beam includes generating a modulated position sensing light beam using the laser light source. In another example, the method further comprises demodulating an output signal from the detector, the output signal including information corresponding to the intensity of the position sensing light beam.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
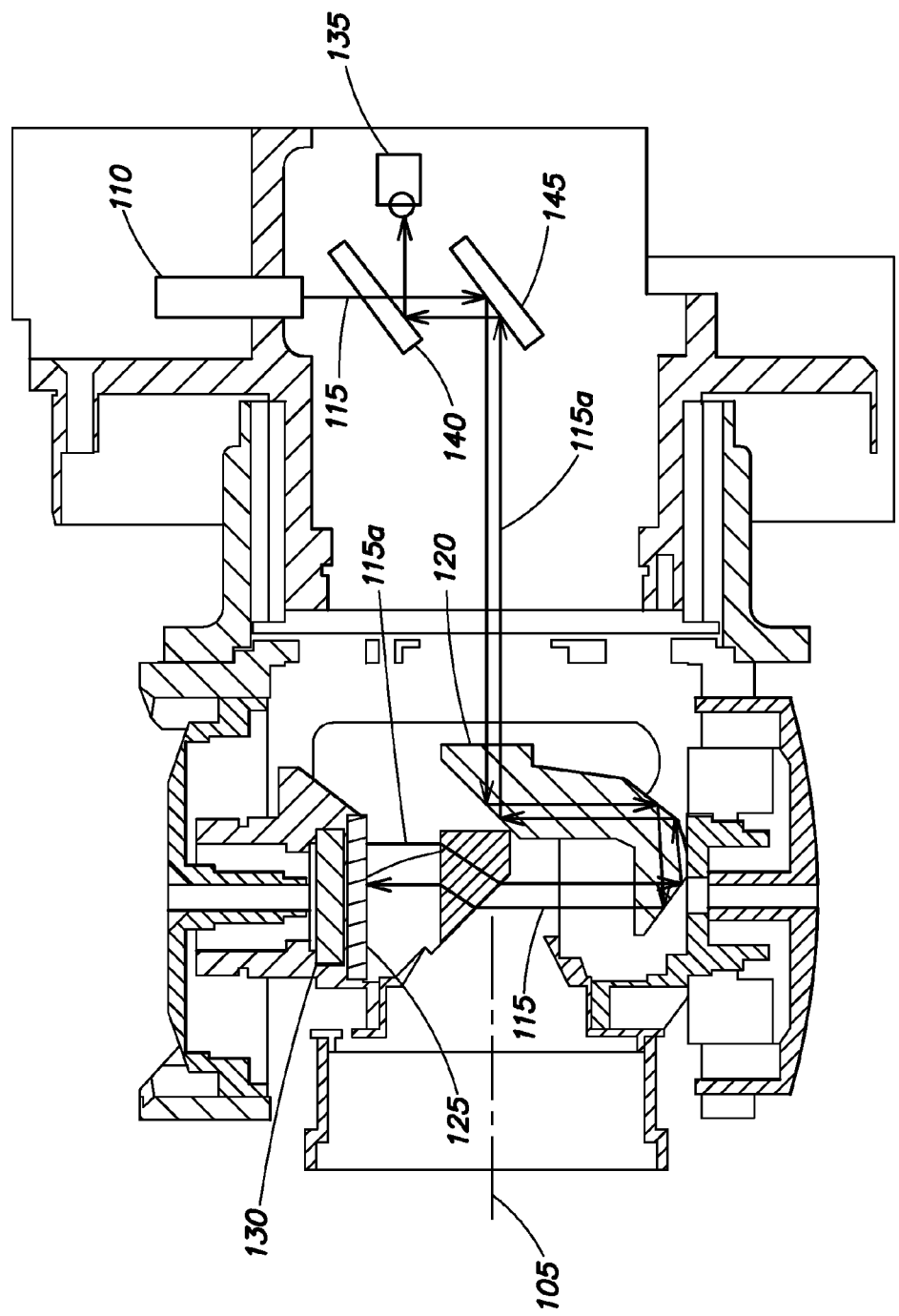
FIG. 1 is a diagram of one example of a portion of an optical system including an optical position encoding mechanism according to aspects of the invention.

Aspects and embodiments are directed to devices and methods for remotely measuring gimbal position in optical systems. In particular, aspects and embodiments are directed to remote optical gimbal position sensing using an optical coude path for roll/nod gimbals. As discussed above, conventional gimbal-based optical systems typically require an expensive slip ring to allow the transfer of data signals to off-gimbal components. However, in many optical systems, the optical detector and associated electronics are off-gimbal components, and therefore, the only data signals passing via the slip ring are those corresponding to the roll/nod gimbal position sensor or angle resolver data. Accordingly, by remotely sensing the nod axis position, the requirement to transfer data via the slip ring may be removed, and a less expensive power-only slip ring may be used. Additionally, as discussed above, packaging advantages may be realized by removing the need for bulky on-gimbal position encoders or angle resolvers.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

According to one embodiment, roll/nod gimbal position sensing is achieved using an existing optical coude path in the optical system to transmit light to and from the nod axis of the gimbal. A light source, such as a laser or light emitting diode (LED), for example, is packaged off-gimbal, along with a detector. The light source transmits a beam along the coude path to an optical element mounted to the nod axis platform. The optical element alters the intensity of light transmitted therethrough, and may be referred to as a transmission-varying optical element. The optical element may include a continuously varying neutral density (ND) filter or set of polarizing plates, for example. As the nod axis rotates, the optical element rotates as well, independently of the coude path beam from the light source. As a result, the beam intensity, affected by the optical element, changes linearly as the gimbal rotates about the nod axis. The beam is reflected from the optical element back via the coude path to the detector, where the changing intensity may be detected and converted into a corresponding gimbal position. Thus, the gimbal positional information may be transferred off-gimbal using light traversing the coude path, and without requiring any electrical data signals to be transferred via a slip ring.

Referring to FIG. 1 there is illustrated a diagram of one example of a portion of an optical system including a remote optical gimbal position sensing system according to certain embodiments. The optical system includes an existing coude path (represented at 120) via which the off gimbal light is received/transmitted along a line of sight 105 of the optical system. As discussed above, a light source 110 mounted off-gimbal generates and transmits a position sensing light beam 115 that travels along the coude path 120 to an optical element 125 that is mounted on-gimbal. The position sensing light beam 115 is reflected from a mirror 130 and returned (return beam 115a) via the coude path 120 to a detector 135 that is off-gimbal. A beam-splitter 140 is used to separate the transmitted and returned position sensing light beams 115, 115a. Another beam-splitter 145 is used to couple the position sensing light beam 115, 115a into and out of the primary optical path of the optical system. In one embodiment, the light source 110 is a laser source that is configured to generate the position sensing light beam 115 at a wavelength (or having a wavelength range) that is outside of the operating or "useful" spectral band of the optics associated with the mission or function of the optical system. For example, if the optical system is an infrared imaging system, the light source 110 may generate the position sensing light beam 115 in the visible spectral range. Accordingly, the beam-splitter 145 may be a dichroic beam-splitter configured to direct electromagnetic radiation in the useful band of the optics to the system's optical detector, and to direct the position sensing light beam 115 into the coude path and the returned position sensing light beam 115a to the detector 135.

As discussed above, the optical element 125 is a device that alters the intensity of the returned position sensing light beam 115a as a function of the angle of the gimbal axis to which it is mounted. For example, the optical element 125 may include a continuously varying ND filter, the transparency/opacity of which varies over the radius of the filter (e.g., from completely opaque at the center to transparent at the periphery, or vice versa, at the wavelength(s) of the position sensing light beam 115). As position of the ND filter is rotated relative to the optical path of the position sensing light beam 115 by rotation of the gimbal axis, the beam will travel through varying transparency/opacity and thus the intensity returned beam is changed. Thus, the angular position of the gimbal is encoded onto the returned position sensing light beam 115a in the varying intensity and may be interpreted by a controller/processor 210 (see FIG. 2) coupled to the detector 135.

In some instances, the optical system may view a scene during daylight and as a result, sunlight may enter the system along the line of sight 105 and potentially be received at the detector 135. Similarly, in various other circumstances, unwanted electromagnetic radiation may travel along the optical path to the detector 135. Such unwanted electromagnetic radiation may add noise, and degrade the position sensing performance. Accordingly, in some embodiments, the detector 135 may include a narrowband filter configured to allow only a narrow range of wavelengths encompassing the wavelength of the position sensing light beam 115a to be received at the detector. Alternatively, such a narrowband filter may be positioned in the optical path directly in front of the detector 135. To further mitigate the effects of stray electromagnetic radiation on the position sensing function, the position sensing light beam 115 may be modulated such that the data processor coupled to the detector 135 may read an AC signal containing the encoded position data, rather than a DC intensity signal.

Figure 2:
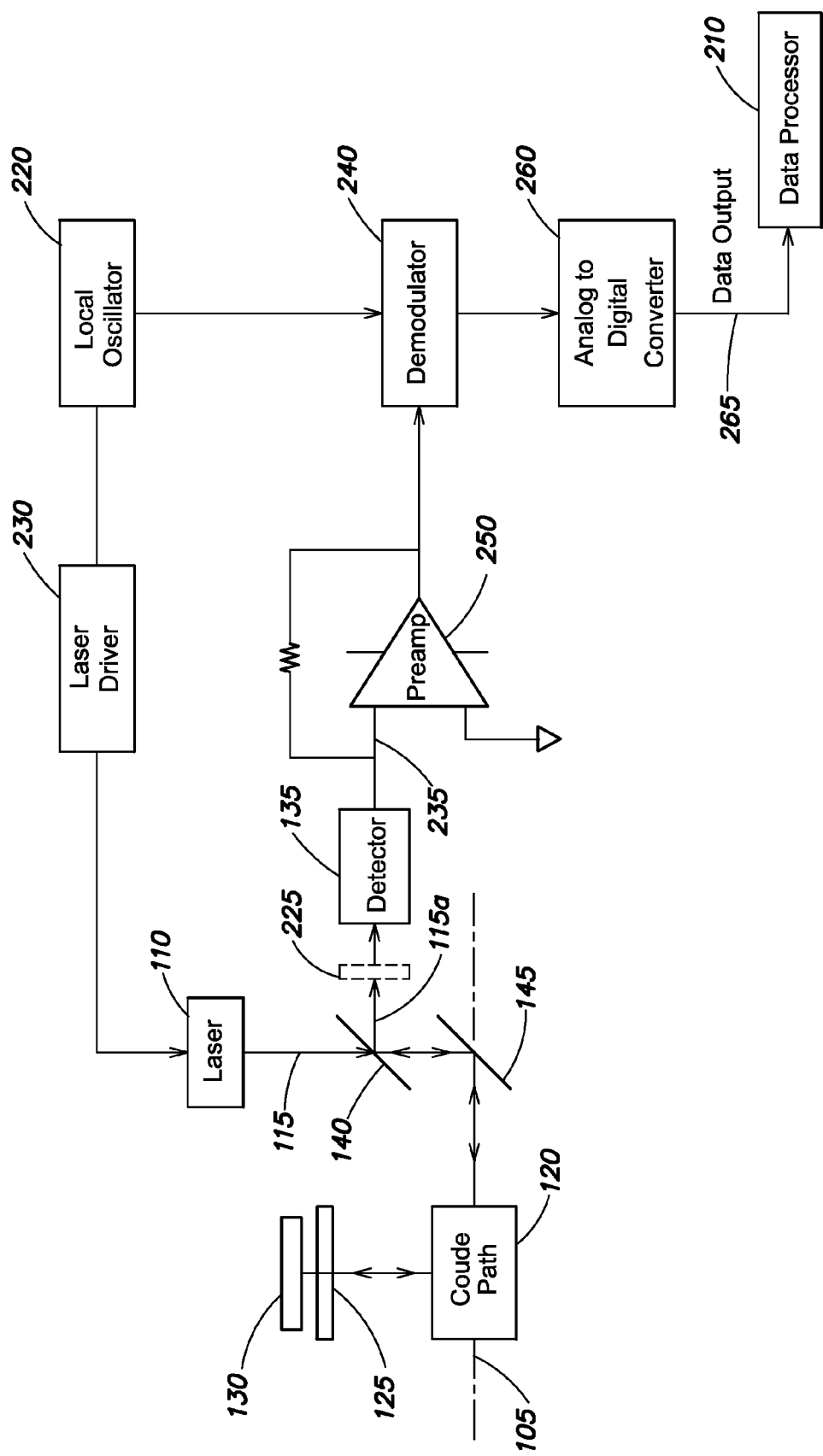
FIG. 2 is a signal block diagram of the optical system including the optical position encoding mechanism, according to aspects of the invention.

Referring to FIG. 2, there is illustrated a signal flow diagram for one example of an optical system including an optical position sensing mechanism as discussed above, and configured to provide an AC read-out from the detector 135. The system electronics include a local oscillator 220 coupled to a laser driver 230 and to a demodulator 240. The local oscillator provides a modulation/timing signal to the laser driver 230, which in turns drives the laser light source 110 to generate a modulated position sensing light beam 115. The returned position sensing light beam 115a is received by the detector 135, and the detector output 235 is fed to an amplifier 250. The amplified output is provided from the amplifier 250 to the demodulator 240, where the signal is demodulated using the same local oscillator signal. The demodulated signal is provided to an analog-to-digital converter 260, which provides a digital data output 265 that contains the encoded position information produced as a function of the intensity of the returned position sensing light beam 115a, as discussed above. This data output 265 may be received and processed by a data processor/controller 210, which is configured to correlate the relative or changes in intensity of the returned position sensing light beam 115a with the gimbal position, and thereby determine the gimbal position.

As will be appreciated by those skilled in the art, given the benefit of this disclosure, in order for the data processor 210 to accurately determine the gimbal position from the intensity of the returned position sensing light beam 115a, the system may be periodically calibrated to produce a known correlation between at least certain gimbal positions and certain intensities of the returned position sensing light beam 115a (given a predetermined intensity of the position sensing light beam 115 produced by the laser light source 110). For example, upon start-up of the optical system, the gimbal may be driven from one hard stop to another (i.e., over a maximum range of motion) and the intensity of the returned position sensing light beam 115a measured at each known angular position of the gimbal at these hard stops, so as to correlate known angular gimbal positions with known intensities of the returned position sensing light beam 115a. The data processor 210 may use these known data points to interpolate a range of intensity over a corresponding range of motion of the gimbal, such that during operation, the measured intensity of the returned position sensing light beam 115a provides the corresponding angular position of the gimbal.

As discussed above, in one example, the optical element 125 may include a neutral density filter. In another example, the optical element 125 may include a set of polarizers. In this example, the system may include a first polarizer 225 that is position in front of the detector 135, and the optical element 125 is a second polarizer that rotates with the gimbal axis. Alternatively, the first polarizer 225 may be positioned in between the laser light source 110 and the beam-splitter 140. The first (fixed position) polarizer 225 polarizes the light that will be received by the detector 135. The second, rotating polarizer changes the amount of polarized light that will be returned to the detector 135, and thus changes the intensity of the returned position sensing light beam 115a. Accordingly, the gimbal position is encoded onto the returned position sensing light beam 115a as a function of the intensity of this beam, as discussed above.

Thus, aspects and embodiments provide an optical position sensing mechanism in which the gimbal position is encoded onto an optical beam that traverses the optical coude path to be transferred off-gimbal, without requiring any electrical data signals to be transferred off-gimbal using a data slip ring. This mechanism advantageously avoids the need for expensive data slip rings, and for bulky position encoders or angle resolvers to be placed on-gimbal. Instead, a simple optical element (e.g., a filter or polarizer) is mounted to the gimbal axis, and position sensing is achieved using optical signals that traverse the pre-existing coude path used for the system's primary optical application (e.g., imaging, sensing, range-finding, etc.).

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical position sensing system for sensing a gimbal position in a gimbal-based optical system comprising:
    a light source configured to generate a position sensing light beam, the light source being mounted off-gimbal in the optical system and further configured to transmit the position sensing light beam along an optical coude path of the optical system;
    an optical element mounted on an axis of the gimbal and configured to cause a change in an intensity of the position sensing light beam based on rotation of the gimbal about the axis;
    a detector mounted off-gimbal in the optical system and configured to receive the position sensing light beam returned from the optical element and to detect the change in the intensity of the position sensing light beam; and
    a controller coupled to the detector and configured to determine the gimbal position based on a correlation between the change in the intensity of the position sensing light beam and the gimbal position.

2. The optical position sensing system of claim 1, wherein the optical element is a continuously varying neutral density filter.

3. The optical position sensing system of claim 1, further comprising a first polarizer positioned off-gimbal in an optical path of the position sensing light beam, and wherein the optical element is a second polarizer.

4. The optical position sensing system of claim 3, wherein the first polarizer is positioned in front of the detector.

5. The optical position sensing system of claim 1, further comprising a mirror disposed behind the optical element and configured to reflect the position sensing light beam back along the coude path.

6. The optical position sensing system of claim 1, further comprising a first beam-splitter configured to couple the position sensing light beam from the light source into the coude path, and to direct the position sensing light beam returned from the coude path toward the detector.

7. The optical position sensing system of claim 6, further comprising a second beam-splitter disposed between the light source and the first beams-splitter, and configured to transmit the position sensing light beam from the light source to the first beam-splitter, and to reflect the position sensing light beam returned from the coude path via the first beam-splitter toward the detector.

8. The optical position sensing system of claim 1, wherein the detector is a silicon intensity detector.

9. The optical position sensing system of claim 1, wherein the light source is a laser light source.

10. The optical position sensing system of claim 9, further comprising:
   a local oscillator located off-gimbal and configured to produce a modulation signal;
   a laser driver coupled to the local oscillator and to the laser light source, and configured to drive the laser light source to produce a modulated position sensing light beam;
   a demodulator coupled to the local oscillator and to the detector, and configured to demodulate an output signal from the detector using the modulation signal to produce a demodulated signal, the demodulated signal including information corresponding to the change in the intensity of the position sensing light beam; and
   an analog to digital converted configured to receive the demodulated signal and to produce a digital version of the demodulated signal;
   wherein the controller is configured to receive and process the digital version of the demodulated signal to determine the gimbal position.

11. The optical position sensing system of claim 10, further comprising an amplifier positioned between the detector and the demodulator and configured to amplify the output signal from the detector to produce an amplified output signal, and wherein the demodulator is configured to demodulate the amplified output signal.

12. A method of sensing a gimbal position in a gimbal-based optical system, the method comprising:
   directing a position sensing light beam along an optical coude path of the optical system to an optical element mounted to a gimbal axis;
   altering an intensity of the position sensing light beam with the optical element;
   receiving the position sensing light beam returned from the optical element via the coude path at a detector located off-gimbal;
   detecting, with the detector, the intensity of the position sensing light beam; and
   determining the gimbal position based on a known correlation between the intensity of the position sensing light beam and an angular position of the gimbal.

13. The method of claim 12, further comprising generating the position sensing light beam using a laser light source.

14. The method of claim 13, wherein generating the position sensing light beam includes generating a modulated position sensing light beam using the laser light source.

15. The method of claim 14, further comprising demodulating an output signal from the detector, the output signal including information corresponding to the intensity of the position sensing light beam.

* * * * *